(12) United States Patent
Kikuchi et al.

(10) Patent No.: US 10,156,334 B2
(45) Date of Patent: Dec. 18, 2018

(54) VEHICULAR LAMP

(71) Applicant: Koito Manufacturing Co., Ltd., Tokyo (JP)

(72) Inventors: Satoshi Kikuchi, Shizuoka (JP); Kentarou Murakami, Shizuoka (JP); Takao Muramatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/958,079

(22) Filed: Apr. 20, 2018

(65) Prior Publication Data

US 2018/0313508 A1    Nov. 1, 2018

(30) Foreign Application Priority Data

Apr. 28, 2017    (JP) .................................. 2017-090377

(51) Int. Cl.
| | |
|---|---|
| *F21S 41/663* | (2018.01) |
| *F21S 41/141* | (2018.01) |
| *F21S 41/675* | (2018.01) |
| *F21Y 115/10* | (2016.01) |

(52) U.S. Cl.
CPC .......... *F21S 41/663* (2018.01); *F21S 41/141* (2018.01); *F21S 41/675* (2018.01); *F21Y 2115/10* (2016.08)

(58) Field of Classification Search
CPC .......... F21S 41/14; F21S 41/141; F21S 41/30; F21S 41/65; F21S 41/663; F21S 41/67; F21S 41/675; B60Q 2200/00; B60Q 2200/30; B60Q 2300/00
See application file for complete search history.

(56) References Cited

U.S. PATENT DOCUMENTS

| | | | |
|---|---|---|---|
| 2011/0267455 A1* | 11/2011 | Gotz ...................... | B60Q 1/085 348/135 |
| 2013/0038736 A1* | 2/2013 | Yamamura ............. | B60Q 1/143 348/148 |

(Continued)

FOREIGN PATENT DOCUMENTS

| | | |
|---|---|---|
| JP | 2008-205357 A | 9/2008 |
| JP | 2012-224317 A | 11/2012 |
| WO | 2016/167250 A | 10/2016 |

*Primary Examiner* — Jason M Crawford
(74) *Attorney, Agent, or Firm* — Abelman, Frayne & Schwab

(57) ABSTRACT

A vehicular lamp is provided with a plurality of light emitting units and configured to independently control ON/OFF of the light emitting units. The plurality of light emitting units are disposed so that a desired light distribution is formed by overlapping scanning of illumination spots formed on a virtual screen by emitted lights thereof. The plurality of light emitting units are divided in a plurality of channels, the same direct drive current is supplied to at least one light emitting unit of all of the light emitting units included in the same channel, and the direct drive current is constantly maintained during a scanning period. The current amount of drive current for each channel is set in accordance with a light distribution mode, and ON/OFF of each light emitting unit is switched at a predetermined timing determined in accordance with the light distribution mode during a scanning period.

11 Claims, 9 Drawing Sheets

(56) References Cited

U.S. PATENT DOCUMENTS

| | | | |
|---|---|---|---|
| 2014/0009952 A1* | 1/2014 | Nomura | H01S 5/00 |
| | | | 362/509 |
| 2014/0313755 A1* | 10/2014 | Tanaka | F21S 48/1305 |
| | | | 362/514 |
| 2015/0069906 A1* | 3/2015 | Niedermeier | H05B 33/0803 |
| | | | 315/77 |
| 2016/0039286 A1* | 2/2016 | Shibata | B60K 35/00 |
| | | | 701/36 |
| 2016/0096467 A1* | 4/2016 | Murakami | H05B 33/0815 |
| | | | 315/82 |
| 2017/0153000 A1* | 6/2017 | Sato | F21S 41/00 |
| 2017/0276308 A1* | 9/2017 | Nakazawa | B60Q 1/1423 |
| 2017/0282786 A1* | 10/2017 | Toda | F21S 41/00 |
| 2018/0056853 A1* | 3/2018 | Muramatsu | B60Q 1/1423 |

\* cited by examiner

VEHICULAR LAMP

CROSS-REFERENCE TO RELATED APPLICATIONS

This application is based on and claims priority from Japanese Patent Application No. 2017-090377, filed on Apr. 28, 2017 with the Japan Patent Office, the disclosure of which is incorporated herein in its entirety by reference.

TECHNICAL FIELD

The present disclosure relates to a vehicular lamp which is used for an automobile or the like.

BACKGROUND

In general, a vehicular lamp may switch between a low beam and a high beam. The low beam illuminates an area close to the vehicle with predetermined illuminance, regulations on light distribution are provided so that the low beam does not cause glare to an oncoming vehicle or a preceding vehicle, and the low beam is mainly used when a vehicle travels in an urban area. Meanwhile, the high beam illuminates a front wide region and a distant area with comparative high illuminance, and the high beam is mainly used when the vehicle travels at a high speed on a road where a few oncoming vehicles or preceding vehicles travel. Therefore, although the high beam provides higher visibility to a driver than the low beam, there is a problem in that the high beam causes glare to a pedestrian or a driver in a vehicle present in front of the vehicle.

Recently, there has been proposed an adaptive driving beam (ADB) technology which dynamically and adaptively controls a light distribution pattern of the high beam in accordance with a peripheral state of a vehicle. The ADB technology detects the presence or absence of a preceding vehicle, an oncoming vehicle, or a pedestrian in front of the vehicle, and reduces illuminance in respect to the region corresponding to the preceding or oncoming vehicle or the pedestrian, thereby reducing the glare to be caused to the preceding or oncoming vehicle or the pedestrian.

As a type of implementing the ADB function, there have been proposed, for example, a shutter type for controlling an actuator, a rotary type, and an LED array type. The shutter type or the rotary type may continuously change the width of an OFF region (light shielding region), but the number of OFF regions is limited to one. The LED array type may set a plurality of OFF regions, but the LED array type is discrete because the width of the OFF regions is limited to a light emitting width of LED chips.

The present applicant has proposed a scanning type as the ADB type capable of solving the aforementioned problems (see, e.g., Japanese Patent Laid-Open Publication No. 2012-224317). The scanning type forms a desired light distribution pattern in front of a vehicle by causing light to be incident on a rotating reflector (blade), reflecting the incident light at an angle in accordance with a rotational position of the reflector, scanning the reflected right in front of the vehicle, and changing ON/OFF or a light quantity of a light source in accordance with the rotational position of the reflector. See, for example, Japanese Patent Laid-Open Publication No. 2008-205357 and International Patent Publication WO2016/167250 A1.

SUMMARY

The present inventors have studied a function of switching light distribution modes in accordance with a traveling scene in an expressway, an urban area, or the like.

When switching a plurality of light distribution modes, illuminance of the same portion (referred to as a "subregion") on a virtual screen greatly varies from mode to mode. In other words, the brightness of a light emitting element such as an LED chip needs to be greatly changed in accordance with the light distribution mode.

In general, PWM dimming is used to control the brightness of the light emitting element in a wide dynamic range. Because one light emitting element (LED chip) corresponds to one region in the array type, when one light emitting element is subjected to the PWM dimming, the brightness of the corresponding region can be changed. Thus, it may be said that the conformity between the array type and the PWM dimming is high.

Meanwhile, it is difficult to adopt the PWM dimming in the scanning type. The reason is that in the scanning type, the ON/OFF of a light emitting element is controlled in synchronization with a periodic motion of the reflector, and as a result, when the PWM dimming is used in conjunction with the control of ON/OFF of the light emitting element, the control operation synchronized with a PWM cycle is performed in conjunction with the control operation synchronized with the periodic motion of the reflector, which makes control complicated. Such complicated control cannot be performed by a low-priced microcomputer, and requires a high-priced microcomputer or a CPU.

The present disclosure has been made in consideration of the problems described above, and provides a vehicular lamp which is capable of switching a plurality of light distribution modes.

One aspect of the present disclosure relates to a vehicular lamp. The vehicular lamp includes: a light source unit including a plurality of light emitting units that are classified into a plurality of channels so that a plurality of light emitting units included in the same channel are connected in series; a scanning optical system configured to receive emitted light of the light source unit and scan the emitted light in front of the vehicle by repeating a predetermined periodic motion; and a lighting circuit configured to operate the plurality of light emitting units. The lighting circuit includes a plurality of lighting units corresponding to the plurality of channels, and a controller configured to control the plurality of lighting units Each of the lighting units includes a constant current driver configured to supply a drive current to the plurality of light emitting units included in a corresponding channel, and a plurality of bypass switches each configured to form a bypass path that is in parallel with a corresponding light emitting unit of the plurality of light emitting units included in the corresponding channel.

The controller is configured to switch a plurality of light distribution modes, and (i) a drive current to be created by each of the constant current drivers and (ii) a period for which each of the plurality of bypass switches is to be turned ON during one scanning period are specified for each light distribution mode in respect to each of the plurality of lighting units.

According to the aspect, the plurality of light distribution modes can be appropriately switched.

The plurality of light emitting units may be disposed such that emitted lights thereof illuminate different points on a virtual screen at a same time.

The plurality of light emitting units included in the same channel may be disposed to illuminate the same height on the virtual screen.

Since the light emitting units, which illuminate the same height, emit light with the same current amount of the drive current, it is possible to simplify the control of the constant current driver.

The plurality of light emitting units may be disposed in two or more stages in a height direction and the greatest number of light emitting units may be disposed in the lowermost stage. Therefore, a region having high illuminance may be formed in the vicinity of an H line on the virtual screen.

The plurality of light emitting units in the lowermost stage may be classified into three or more channels. Therefore, it is possible to implement electronic swiveling.

The plurality of light emitting units may be disposed in N stages ($N \geq 3$). When a current amount to be supplied to an $i^{th}$ ($1 \leq i \leq N$) light emitting unit from a lower side is $I_i$, a relationship of $I_1 \geq \ldots \geq I_N$ may be satisfied in each of the plurality of light distribution modes. The plurality of light distribution modes may satisfy a relationship of $I_1 \geq \ldots \geq I_N$ when the current to be supplied to the $i^{th}$ ($1 \leq i \leq N$) light emitting unit from the lower side is Ii. Therefore, it is possible to simplify the design of the plurality of constant current drivers.

The plurality of light emitting units may be disposed in N stages ($N \geq 3$), and when a maximum current to be supplied to an $i^{th}$ ($1 \leq i \leq N$) light emitting unit from a lower side is $I_{i(MAX)}$, a relationship of $I_{1(MAX)} > \ldots > I_{N(MAX)}$ may be satisfied.

The plurality of light emitting units may be disposed in a U shape, an inverted T shape, a rotated E shape, or a rotated L shape.

The controller may also form a bypass path by the corresponding bypass switch while the emitted lights of the light emitting units pass through a light shielding region. Therefore, it is possible to inhibit glare from being provided to a front vehicle.

The vehicular lamp may be configured such that a light condensing region formed by emitted light of the scanning optical system and a diffusion region formed by emitted light of a non-scanning optical system overlap each other. A scanning range by a scanning optical system needs to be widely designed in order to form a diffusion region only by the scanning optical system. However, the scanning range of the scanning optical system may be reduced by combining a non-scanning optical system.

Any combinations of the aforementioned constituent elements or substitutions of the constituent elements and expressions of the present disclosure among the method, the apparatus, the system, and the like are also effective as aspects of the present disclosure.

According to any aspect of the present disclosure, the scanning type vehicular lamp may switch various light distribution modes.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF EMBODIMENT

Figure 1:
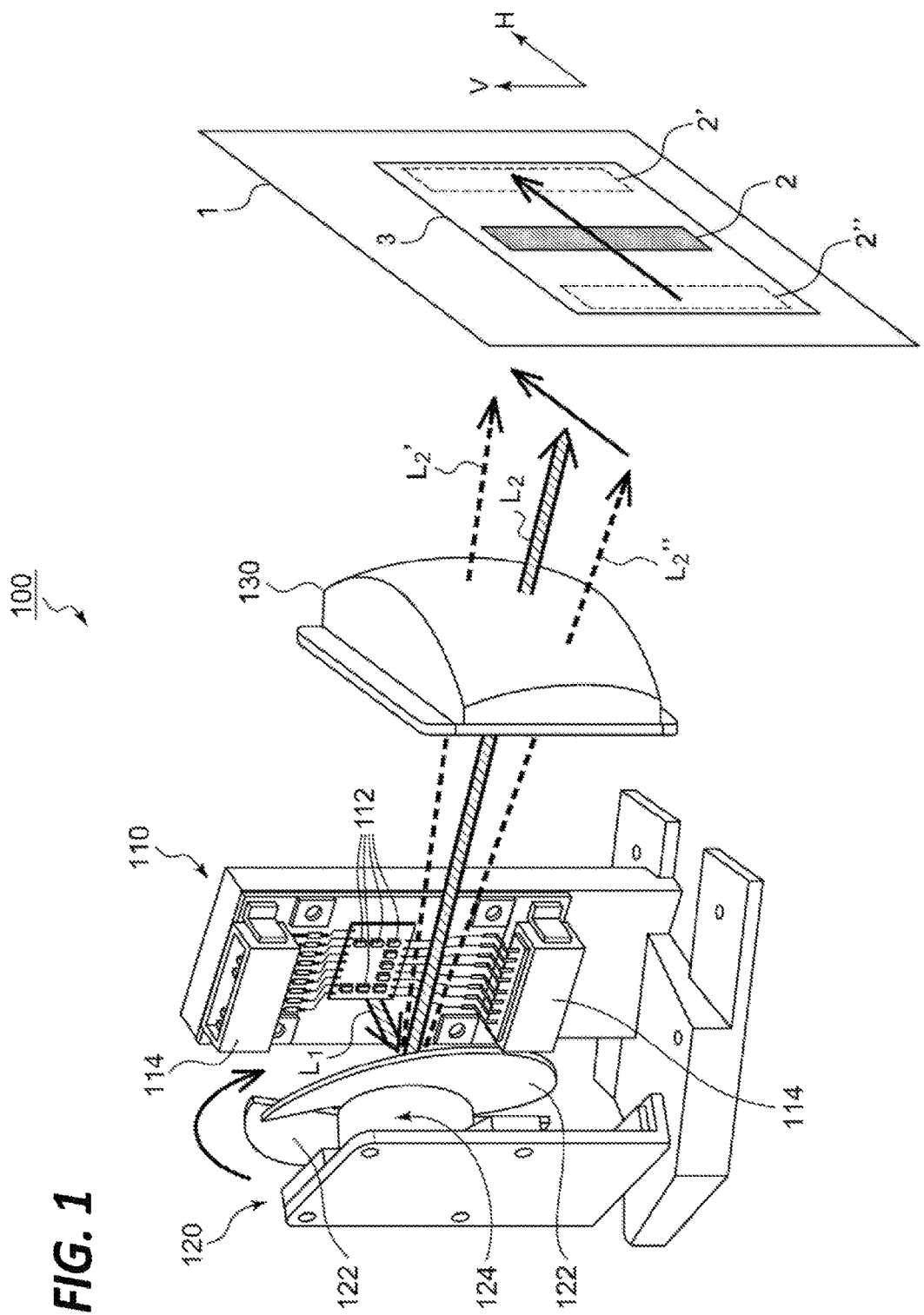
FIG. 1 is a perspective view of a vehicular lamp according to an exemplary embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, based on suitable exemplary embodiments, the present disclosure will be described with reference to the drawings. The same or equivalent constituent elements, members, and processings illustrated in the respective drawings will be denoted by the same reference numerals, and repeated descriptions thereof will be appropriately omitted. In addition, the exemplary embodiment exemplifies the present disclosure, rather than limiting the present disclosure, and all the features or combinations thereof, which are disclosed in the exemplary embodiment as an example, is not necessarily essential for the present disclosure.

In this specification, "a state in which a member A and a member B are connected to each other" includes not only a case in which the member A and the member B are physically and directly connected to each other, but also a case in which the member A and the member B are indirectly connected to each other via other members which do not substantially affect an electrically connected state therebetween or do not impair a function or an effect exhibited by the engagement therebetween.

Similarly, "a state in which a member C is provided between a member A and a member B" includes not only a case in which the member A and the member C or the member B and the member C are directly connected to each other, but also a case in which the member A and the member C or the member B and the member C are indirectly connected to each other through other members which do not substantially affect an electrically connected state therebetween or do not impair a function or an effect exhibited by the engagement therebetween.

In the present specification, the symbols, which denote electrical signals such as voltage signals and current signals, or circuit elements such as resistors and capacitors, indicate, as necessary, voltage values, current values, resistance values, and capacitance values.

An overview of a vehicular lamp 100 according to an exemplary embodiment will be described.

The vehicular lamp 100 is a scanning type ADB head lamp and is configured to switch a plurality of light distribution modes. The vehicular lamp 100 is provided with a plurality of light emitting units. ON/OFF of the plurality of light emitting units may be switched independently. The plurality of light emitting units are disposed such that a desired light distribution is formed by overlapping scanning of illumination spots formed on a virtual screen by emitted lights thereof. The plurality of light emitting units are classified into a plurality of channels, the same DC current is supplied to all of one or more light emitting units included in the same channel, and the DC current is constantly maintained during a scanning period.

The current amount of DC current for each channel is set in accordance with the light distribution mode. In addition, ON/OFF of each of the light emitting units is switched at a predetermined timing set in accordance with the light distribution mode during the scanning period.

That is, each of the light emitting units is turned ON/OFF at an appropriate timing while a constant drive current is supplied to the plurality of light emitting units, and as a result, a desired light distribution pattern may be formed. Further, it is possible to change the light distribution pattern by changing the current amount of drive current and the timing of ON/OFF of the light emitting unit, and as a result, it is possible to implement the plurality of light distribution modes. The light distribution modes may be adaptively switched in accordance with a traveling scene or may be switched in accordance with an instruction from a user. It is not necessary to change the drive current at a high speed during an ON period in one scanning period of the light emitting unit, and as a result, there is an advantage in that a constant current driver for producing the drive current may be easily designed.

Hereinafter, a specific configuration of the vehicular lamp 100 will be described. FIG. 1 is a perspective view of the vehicular lamp 100 according to an exemplary embodiment. The vehicular lamp 100 in FIG. 1 is a scanning type lamp and may select the plurality of light distribution modes in accordance with the traveling scene.

The vehicular lamp 100 is mainly provided with a light source unit 110, a scanning optical system 120, a projection optical system 130, and a non-illustrated lighting circuit 200. The light source unit 110 includes a plurality of light emitting units 112. The plurality of light emitting units 112 are connected to the non-illustrated lighting circuit 200 through a connector 114. The light emitting unit 112 includes a semiconductor light source such as a light emitting diode (LED) or a semiconductor laser (LD). One light emitting unit 112 constitutes a minimum unit for controlling brightness and ON/OFF of the light emitting unit. One light emitting unit 112 may be one LED chip (LD chip) or may include a plurality of LED chips (LD chips) which are connected in series and/or parallel.

The scanning optical system 120 receives emitted light $L_1$ of the light source unit 110 and repeats a predetermined periodic motion, thereby scanning the front side of the vehicle with reflected light $L_2$ in a lateral direction (H direction in the drawing). The projection optical system 130 projects the reflected light $L_2$ of the scanning optical system 120 onto a virtual screen in front of the vehicle. The projection optical system 130 may include a reflection optical system, a transmission optical system, or a combination thereof.

Specifically, the scanning optical system 120 is provided with a reflector 122 and a motor 124. The reflector 122 is mounted on a rotor of the motor 124 and performs a rotational motion. In the present exemplary embodiment, two reflectors 122 are provided, and the emitted light $L_2$ is emitted twice as the motor 124 is rotated once. Therefore, a scanning frequency is two times a rotational speed of the motor. Here, the number of reflectors 122 is not particularly limited.

At a certain time $t_0$, the emitted light $L_1$ of the light source unit 110 is reflected at an angle in accordance with a position of the reflector 122 (a rotation angle of the rotor), and the reflected light $L_2$ in this case forms one illumination region 2 on the virtual screen 1 in front of the vehicle. In FIG. 1, for a brief description, the illumination region 2 is illustrated as having a rectangular shape, but as described below, the shape of the illumination region 2 is not limited to the rectangular shape.

At another time $t_1$, the reflection angle is changed as the position of the reflector 122 is changed, and reflected light $L_2'$ in this case forms an illumination region 2'. At still another time $t_2$, the reflection angle is changed as the position of the reflector 122 is changed, and reflected light $L_2''$ in this case forms an illumination region 2''.

The illumination region 2 scans the virtual screen 1 as the scanning optical system 120 is rotated at a high speed, and as a result, a light distribution pattern 3 is formed in front of the vehicle.

Figure 2A:
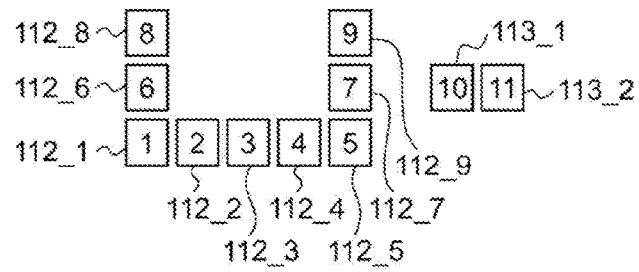
FIGS. 2A to 2D are views for explaining the formation of a light distribution pattern.

FIGS. 2A to 2D are views for explaining a process of forming the light distribution pattern 3. FIG. 2A illustrates a layout of the plurality of light emitting units 112 of the light source unit 110. In the present exemplary embodiment, the number of a plurality of light emitting units 112 is nine.

The plurality of light emitting units 112 are disposed in two or more stages in a height direction, and in this example, the plurality of light emitting units 112 are disposed in three stages, and the lowermost stage has the greatest number of light emitting units 112. Therefore, a region having high illuminance may be formed in the vicinity of an H line on the virtual screen.

The vehicular lamp 100 according to the present exemplary embodiment forms a light distribution pattern by overlap between light distribution made by scanning and light distribution made by non-scanning. The light source unit 110 is provided with at least one light emitting unit 113_1 or 113_2 for widely illuminating the front side of the vehicle in a non-scanning manner in addition to a plurality of scanning light emitting units 112_1 to 112_9. The emitted lights of the light emitting units 113_1 and 113_2 illuminate the virtual screen 1 via an optical system (not illustrated) different from the scanning optical system 120.

Figure 2B:
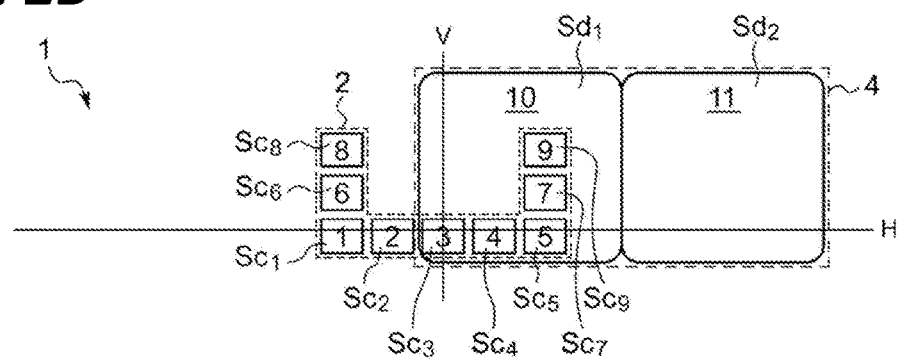

FIG. 2B is a view illustrating illumination spots formed on the virtual screen 1 by the emitted lights of the light emitting units 112 and 113 when the reflector 122 is located at a predetermined position.

An illumination spot formed by the scanning light emitting unit 112 is referred to as a light condensing spot Sc. $Sc_i$ indicates a light condensing spot formed by an $i^{th}$ ($1 \le i \le 9$) light emitting unit 112_$i$. A cluster of the plurality of light condensing spots $Sc_1$ to $Sc_9$ in FIG. 2B corresponds to the illumination region 2 in FIG. 1.

An illumination spot formed on the virtual screen 1 by a diffusion light emitting unit 113 is referred to as a diffusion spot Sd. $Sd_i$ indicates a light condensing spot formed by an $i^{th}$ light emitting unit 113_$i$. The diffusion spot Sd is not related to the rotation of the reflector 122. A cluster of the diffusion spots $Sd_1$ and $Sd_2$ is referred to as a diffusion region 4.

FIG. 2B illustrates only the illumination spots Sc and Sd formed by a right lamp. When the right lamp is configured to be symmetrical, with respect to a vertical line, with a left lamp, an illumination spot, which is formed by inverting the illumination spot in FIG. 2B from right to left with respect to a V line, is formed by the left lamp.

Figure 2C:
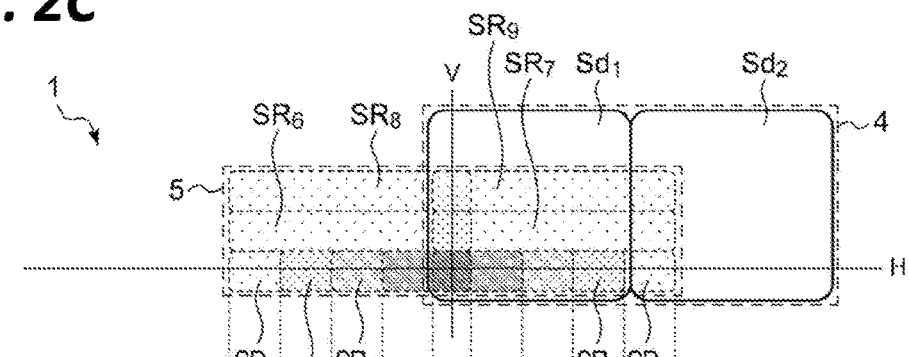

FIG. 2C illustrates regions (referred to as scanning regions) SR through which the light condensing spots Sc pass when the reflector 122 is rotated. $SR_i$ indicates a region through which an $i^{th}$ light condensing spot $Sc_i$ passes. A cluster of the scanning regions $SR_1$ to $SR_9$, that is, a region where the illumination region 2 is scanned is referred to as a light condensing region 5. The light condensing region 5 overlaps the diffusion region 4.

Figure 2D:
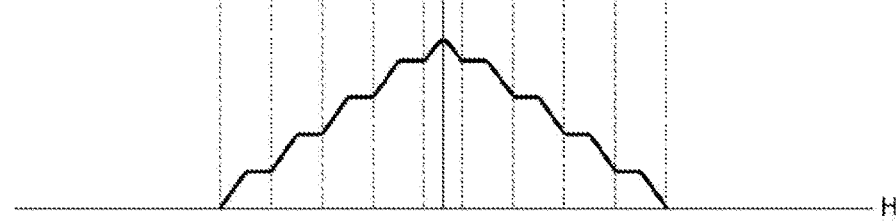

FIG. 2D illustrates an illuminance distribution in a horizontal direction of a light distribution pattern in the vicinity of the H line which is formed by the light emitting units 112_1 to 112_5 in the lowermost stage.

The actually formed light distribution pattern includes the light distribution pattern of the right lamp and the light distribution pattern of the left lamp which overlap each other. In this example, the light condensing region 5 of the right lamp and the light condensing region 5 of the left lamp substantially overlap each other. In addition, the diffusion region 4 of the right lamp mainly illuminates a right side from the V line, and the diffusion region 4 (not illustrated) of the left lamp mainly illuminates a left side from the V line.

Figure 9A:
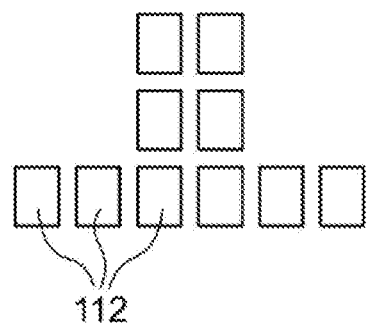
FIGS. 9A to 9C are views illustrating modifications of layouts of the light emitting units.
Figure 9B:
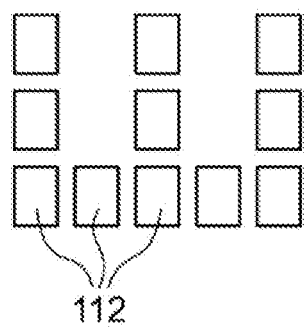

As described above, the plurality of scanning light emitting units 112_1 to 112_9 are disposed such that the the emitted lights thereof illuminate different positions on the virtual screen, respectively. As illustrated in FIG. 2A, the plurality of light emitting units 112 may be disposed in a U shape. Since the plurality of light emitting units 112 are arranged in a U shape (or E shape as illustrated in FIG. 9B), right and left ends of the light condensing regions in the first, second, and third stages may be uniformly arranged.

A corresponding relationship between the plurality of light emitting units 112 and the channels is as follows for example.

First channel $CH_1$=Light emitting units 112_1 and 112_2
Second channel $CH_2$=Light emitting unit 112_3
Third channel $CH_3$=Light emitting units 112_4 and 112_5
Fourth channel $CH_4$=Light emitting units 112_6 and 112_7
Fifth channel $CH_5$=Light emitting units 112_8 and 112_9

The plurality of light emitting units 112 are disposed in the three stages in the height direction, and the light emitting units 112, which illuminate the same height, are classified in the same channel so that the same current amount of drive current is supplied to the light emitting units 112.

The light emitting units 113_1 and 113_2 for the diffusion region are classified in a sixth channel $CH_6$.

The aforementioned configuration is a basic configuration of the lamp 100. An operation will be subsequently described.

Figure 3A:
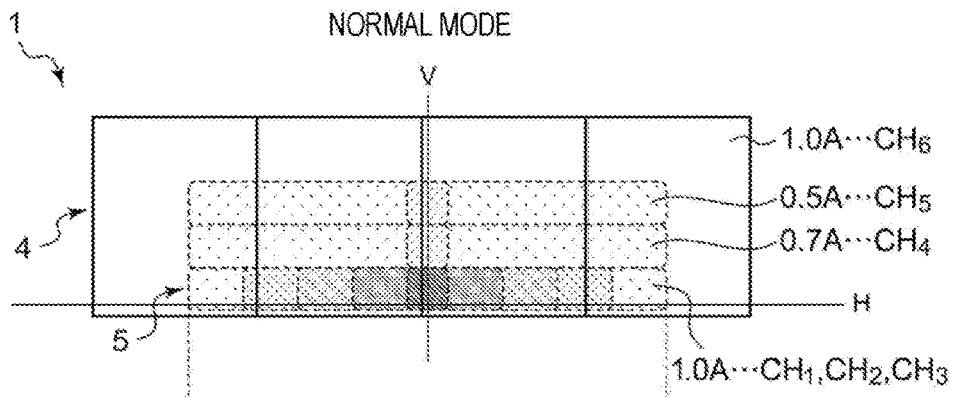
FIGS. 3A to 3C are views for explaining specific examples of a plurality of light distribution modes which may be implemented by the vehicular lamp.
Figure 3B:
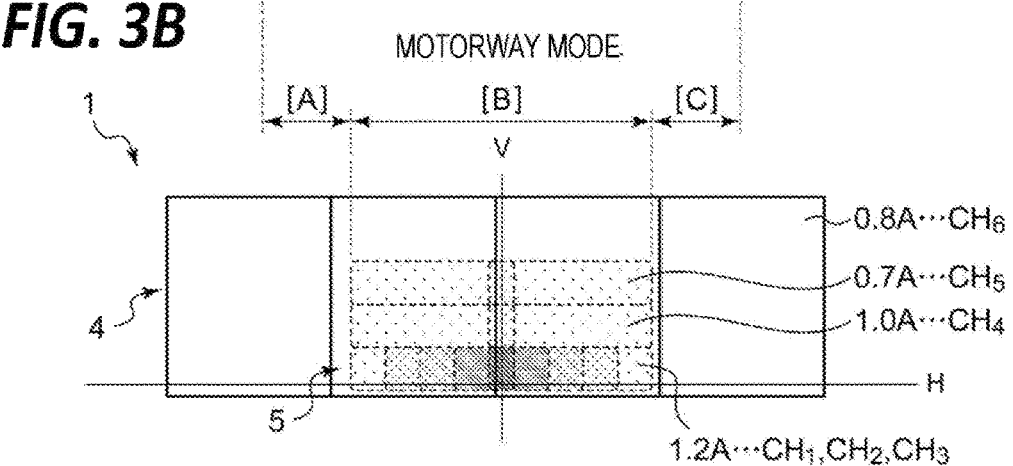
Figure 3C:
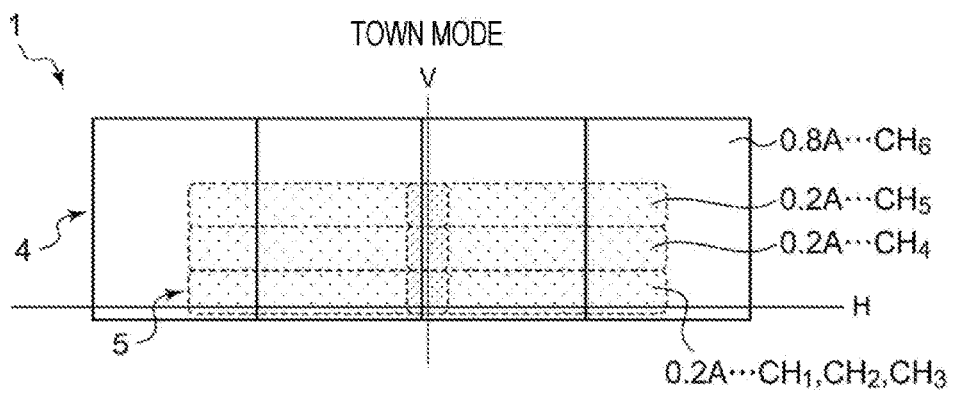

FIGS. 3A to 3C are views for explaining specific examples of a plurality of light distribution modes which may be implemented by the lamp 100. For example, among the plurality of light distribution modes, a light distribution mode illustrated in FIG. 3A is a normal mode, another light distribution mode illustrated in FIG. 3B is a motorway mode, and still another light distribution mode illustrated in FIG. 3C is a town mode. FIGS. 3A to 3C illustrate light distribution patterns on the virtual screen 1 in respect to the respective light distribution modes, in which overlap between the left and right lamps is illustrated. FIGS. 3A to 3C illustrate the current amount of drive current $I_{DRV}$ to be supplied to the light emitting units 112 in the respective channels.

Referring to FIG. 3A, in the normal mode, a set value of the drive current of the three channels $CH_1$, $CH_2$, and $CH_3$ in the lowermost stage is 1.0 A, a set value of the drive current of the channel $CH_4$ in the second stage from the lower side is 0.7 A, and a set value of the drive current of the channel $CH_1$ in the uppermost stage is 0.5 A. In addition, a set value of the drive current of the diffusion channel $CH_6$ is 1.0 A. All of the light emitting units 112 remain in the ON state during the scanning period.

The motorway mode is selected in an expressway or a toll road. Referring to FIG. 3B, in the motorway mode, a set value of the drive current of the three channels $CH_1$, $CH_2$, and $CH_3$ in the lowermost stage is 1.2 A, a set value of the drive current of the channel $CH_4$ in the second stage from the lower side is 1.0 A, and a set value of the drive current of the channel $CH_5$ in the uppermost stage is 0.7 A. In addition, a set value of the drive current of the diffusion channel $CH_6$ is 0.8 A, and the diffusion region 4 is set to be darker than that in the normal mode.

In the motorway mode, the width of the scanning region SR of the light emitting unit 112 is smaller than that in the normal mode in FIG. 3A so that the width of the light condensing region 5 is smaller than the width in the normal mode, and illuminance at a center is intensively increased by increasing brightness of the light emitting unit 112.

The town mode is selected in an urban area where many streetlights are present. Referring to FIG. 3C, in the town mode, a set value of the drive current of all of the channels $CH_1$ to $CH_5$ is 0.2 A. In addition, a set value of the drive current of the diffusion channel $CH_6$ is 0.8 A, and the diffusion region 4 is set to be darker than that in the normal mode.

In the motorway mode, the width of the light condensing region 5 is substantially equal to the width in the normal mode, but the illuminance is set to be low by greatly reducing brightness of the light emitting unit 112. A bypass switch is controlled such that all of the light emitting units 112 remain turned ON during the scanning period.

The aforementioned operation is an operation of the vehicular lamp 100.

According to the vehicular lamp 100, a constant drive current $I_{DRV}$, which is specified for each channel, is supplied to the plurality of light emitting units 112, and the respective light emitting units 112 are turned ON/OFF at an appropriate timing, such that a desired light distribution pattern may be formed.

It is possible to change the light distribution pattern by changing the current amount of drive current $I_{DRV}$ and the timing of ON/OFF of the light emitting unit 112, and as a result, it is possible to implement the plurality of light distribution modes.

The light distribution modes may be adaptively switched in accordance with a traveling scene or may be switched in accordance with an instruction from a user. It is not necessary to change the drive current at a high speed during an ON period in one scanning period of the light emitting unit, and as a result, there is an advantage in that a constant current driver for producing the drive current can be easily designed.

The present disclosure covers various devices, methods, and systems derived from the aforementioned description, and the present disclosure is not limited to a specific configuration. Hereinafter, more specific configuration examples or exemplary embodiments will be described in order to help the understanding of essences and operations of the disclosure or make the essences and operations of the disclosure clear instead of reducing the scope of the present disclosure.

Figure 4:
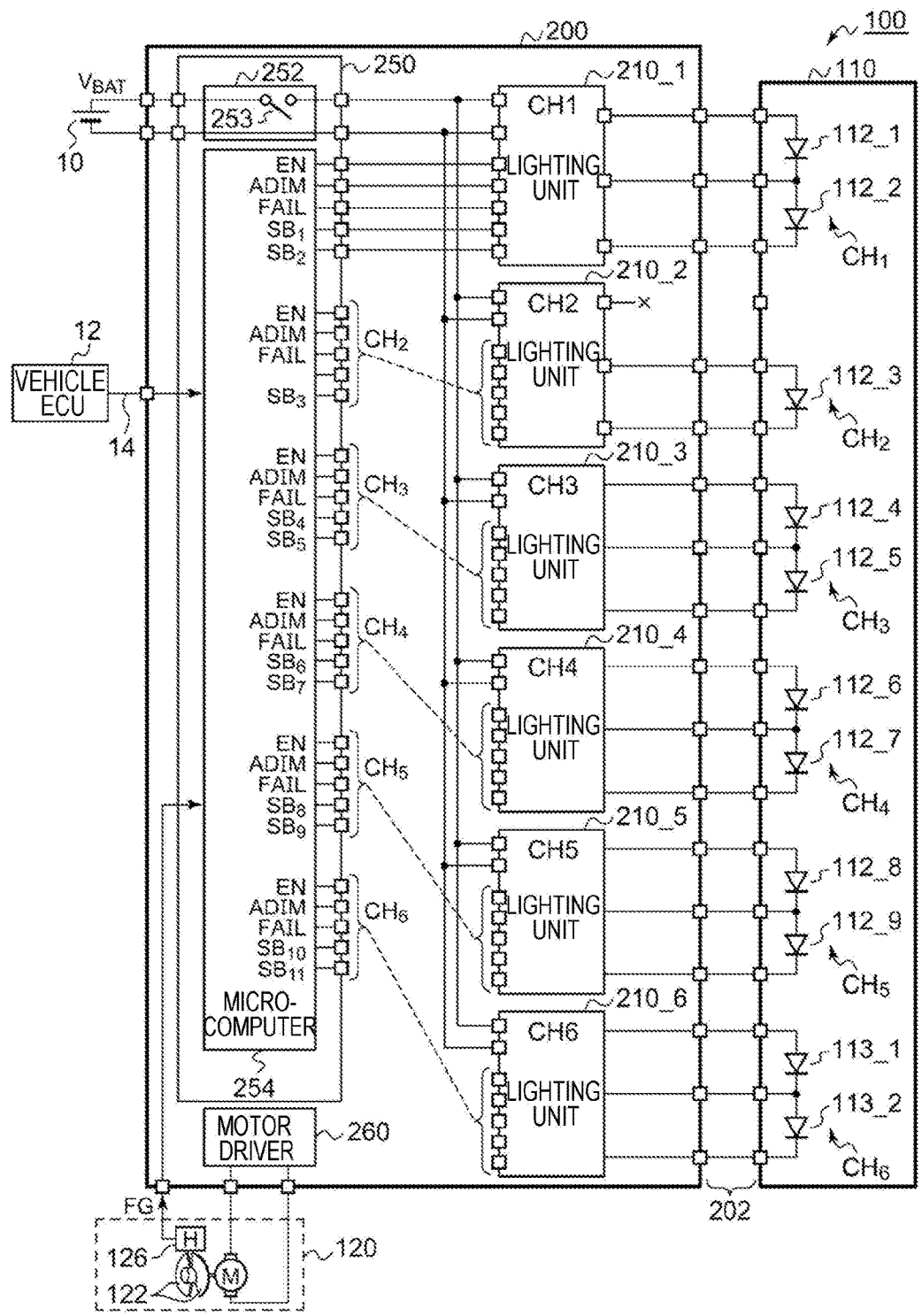
FIG. 4 is a block diagram illustrating an electric system of the vehicular lamp.

Next, a more specific configuration example of the vehicular lamp 100 will be described. FIG. 4 is a block diagram illustrating an electric system of the vehicular lamp 100. The vehicular lamp 100 is provided with the light source unit 110 and the lighting circuit 200. As described above, the light source unit 110 includes the plurality of scanning light emitting units 112 and the plurality of diffusion light emitting units 113.

As described above, the plurality of scanning light emitting units 112_1 to 112_9 are classified into the plurality of channels $CH_1$ to $CH_5$. The plurality of light emitting units 112 included in the same channel are disposed to illuminate the same height on the virtual screen. In other words, the plurality of light emitting units 112, which are disposed to illuminate the same height on the virtual screen, are included in the same channel.

Specifically, as illustrated in FIGS. 2A to 2D, the plurality of light emitting units 112_1 and 112_2, which illuminate the lowermost stage on the virtual screen 1, form the first channel $CH_1$, the light emitting unit 112_3 forms the second channel $CH_2$, and the light emitting units 112_4 and 112_5 form the third channel $CH_3$. In addition, the plurality of light emitting units 112_6 and 112_7, which illuminate the second stage from the lower side, form the fourth channel $CH_4$. In addition, the plurality of light emitting units 112_8 and 112_9, which illuminate the third stage from the lower side, form the fifth channel $CH_5$. The plurality of light emitting units included in the same channel are connected in series. In addition, the diffusion light emitting units 113_1 and 113_2 form the separate channel $CH_6$.

The lighting circuit 200 is connected to the light source unit 110 through a harness 202, and operates the plurality of light emitting units 112 by being supplied with direct current voltage (battery voltage) $V_{BAT}$ from a battery 10. Specifically, the lighting circuit 200 may control brightness of the light emitting unit 112 for each channel, and may control the ON/OFF of each light emitting unit 112.

The lighting circuit 200 is provided with a plurality of lighting units 210_1 to 210_5 (and 210_6) corresponding to the plurality of channels $CH_1$ to $CH_5$ (and $CH_6$), a lamp electronic control unit (ECU) 250, and a motor driver 260. The lamp ECU is simply referred to as a controller.

The lamp ECU 250 controls the plurality of lighting units 210_1 to 210_6. For example, the lamp ECU 250 includes an input stage 252 and a microcomputer 254. The input stage 252 includes a semiconductor switch 253 which is provided in a supply path of the battery voltage $V_{BAT}$, and a filter (not illustrated) for removing noise. The microcomputer 254 is connected to an ECU 12 of the vehicle through a bus 14 for a vehicle-mounted network such as a local interconnect network (LIN) or a controller area network (CAN). (i) Information indicating a traveling scene or a light distribution mode, and (ii) information indicating a region in which light needs to be blocked, and the like are transmitted to the microcomputer 254 from the vehicle ECU 12. The microcomputer 254 selects the light distribution mode based on the information from the vehicle ECU 12 and also forms the light shielding region.

The motor driver 260 operates the motor 124 of the scanning optical system 120 and stabilizes a rotational speed of the motor 124 to a target value. For example, the motor 124 may be a brushless DC motor. A configuration of a circuit of the motor driver 260 is not particularly limited, and a publicly known motor driver may be used. The scanning optical system 120 outputs a periodic rotation signal FG synchronized with the rotation of the reflector 122. The FG signal may be created based on a Hall signal created by a Hall element 126.

For example, in a case in which the two reflectors 122 are provided as illustrated in FIG. 1, the Hall element may be positioned such that the rotation signal FG transitions to a high level each time a gap (slit) between the two reflectors 122 passes a reference position.

The FG signal is inputted to the controller 250. The controller 250 controls the lighting unit 210_1 to 210_5 by being synchronized with the FG signal. Regarding the lighting unit 210_6, the synchronization with the FG signal is not required.

Figure 5:
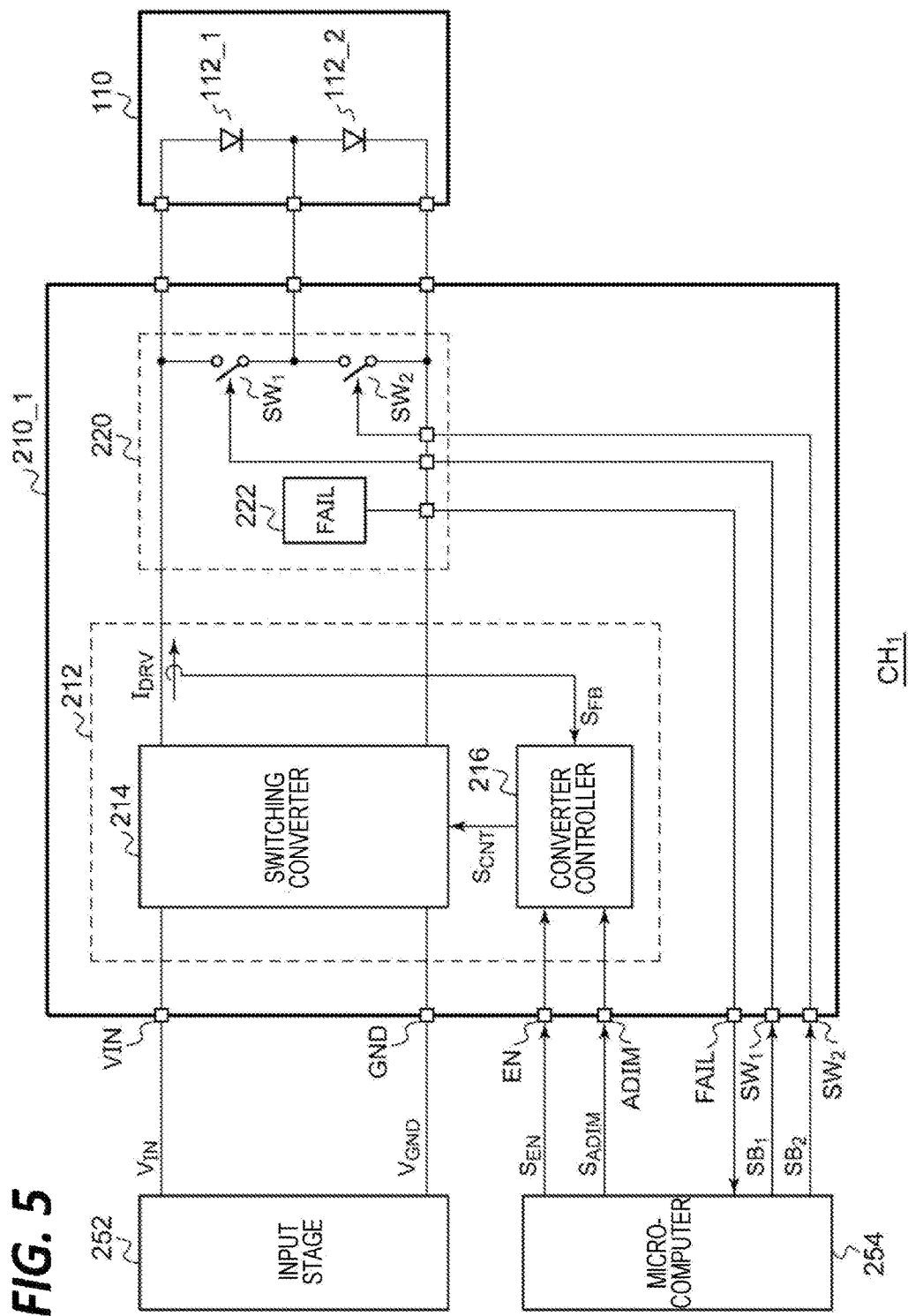
FIG. 5 is a block diagram illustrating a configuration of one channel in the vehicular lamp.

FIG. 5 is a block diagram illustrating a configuration of one channel of the vehicular lamp 100. Each of the channels includes the plurality of light emitting units 112, the lighting unit 210, and a part of the microcomputer 254 of the lamp ECU 250. Here, the first channel $CH_1$ will be described as an example.

The lighting unit 210 includes a constant current driver 212 and a bypass circuit 220. The battery voltage (input voltage $V_{IN}$) is supplied to a VIN (input voltage) pin of the lighting unit 210 through the input stage 252. In addition, grounding voltage $V_{GND}$ is supplied to a GND (ground) pin. An enable signal SEN, which indicates an operation or stop of the constant current driver 212, is inputted to EN (enable) pin, and a DC dimming signal $S_{ADIM}$, which indicates a target value of the drive current $I_{DRV}$ created by the constant current driver 212, is inputted to a DC dimming (ADIM) pin.

The constant current driver 212 supplies the drive current $I_{DRV}$ to the plurality of light emitting units 112_1 and 112_2 included in the corresponding channel $CH_1$. For example, the constant current driver 212 includes a switching converter 214 and a converter controller 216. The switching converter 214 is a step-down, step-up, or step-up-down converter, and receives the input voltage $V_{IN}$ (battery voltage $V_{BAT}$) supplied to the VIN pin. The type of switching converter 214 is determined in accordance with the number of light emitting units 112 of an object to be operated.

When the maximum two light emitting units 112 are allocated to one channel as described in the present exemplary embodiment, it is possible to integrate the switching converter 214 to the step-down converter.

The converter controller 216 creates a control pulse $S_{CNT}$ for operating a switching element of the switching converter 214. The converter controller 216 controls at least one of a duty ratio, a frequency, and density of the control pulse $S_{CNT}$ so that a detection value (feedback signal $S_{FB}$) of the drive current $I_{DRV}$ is approximate to a target value indicated by the DC dimming signal $S_{ADIM}$ from the microcomputer 254.

The control method of the converter controller 216 is not particularly limited, and a publicly known circuit may be used. For example, the converter controller 216 may be a controller for ripple control, and may adopt hysteresis control, a peak detection OFF time fixing method, a bottom detection ON time fixing method, and the like. Otherwise, the converter controller 216 may be a pulse width modulation (PWM) controller using an error amplifier, or a digital controller using PI control or PID control.

The bypass circuit 220 includes a plurality of bypass switches $SW_1$ and $SW_2$. Each of the bypass switches SW may form a bypass path which is in parallel with the corresponding light emitting unit of the light emitting units 112_1 and 112_2 included in the corresponding channel $CH_1$. The bypass switch SW may include a field effect transistor (FET) and the like. ON/OFF of the bypass switches $SW_1$ and $SW_2$ is controlled in accordance with bypass control signals $SB_1$ and $SB_2$ from the microcomputer 254. A fail detecting circuit 222 creates a fail signal by detecting abnormality such as an open or short circuit of the light emitting unit 112.

The aforementioned configuration is the configuration of the first channel $CH_1$. The similar configuration applies to the second to six channels $CH_2$ to $CH_6$. When the bypass switch $SW_j$ ($1 \leq j \leq 9$) is turned OFF, the drive current $I_{DRV}$ flows to the corresponding light emitting unit $112j$, such that the light emitting unit $112j$ emits light. When the bypass switch $SW_j$ is turned ON, the drive current $I_{DRV}$ flows to the bypass switch $SW_j$ instead of the light emitting unit $112j$, such that the corresponding light emitting unit $112j$ is turned OFF.

The lamp ECU 250 (microcomputer 254) is configured such that the plurality of light distribution modes may be switched. In the microcomputer 254, (i) the drive current $I_{DRV}$ to be created by the respective constant current drivers 212, and (ii) a period for which the respective a plurality of bypass switches SW are to be turned ON (a period for which the respective bypass switches SW are to be turned OFF) during one scanning period are specified for each light distribution mode in respect to each of the lighting units 210_1 to 210_5.

Figure 6A:
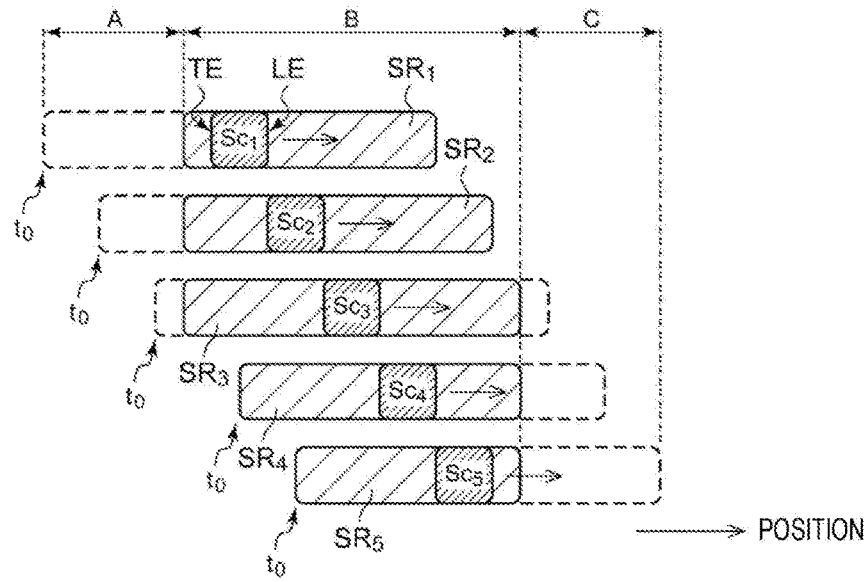
FIGS. 6A and 6B are views for explaining the formation of a light distribution pattern in a motorway mode.
Figure 6B:
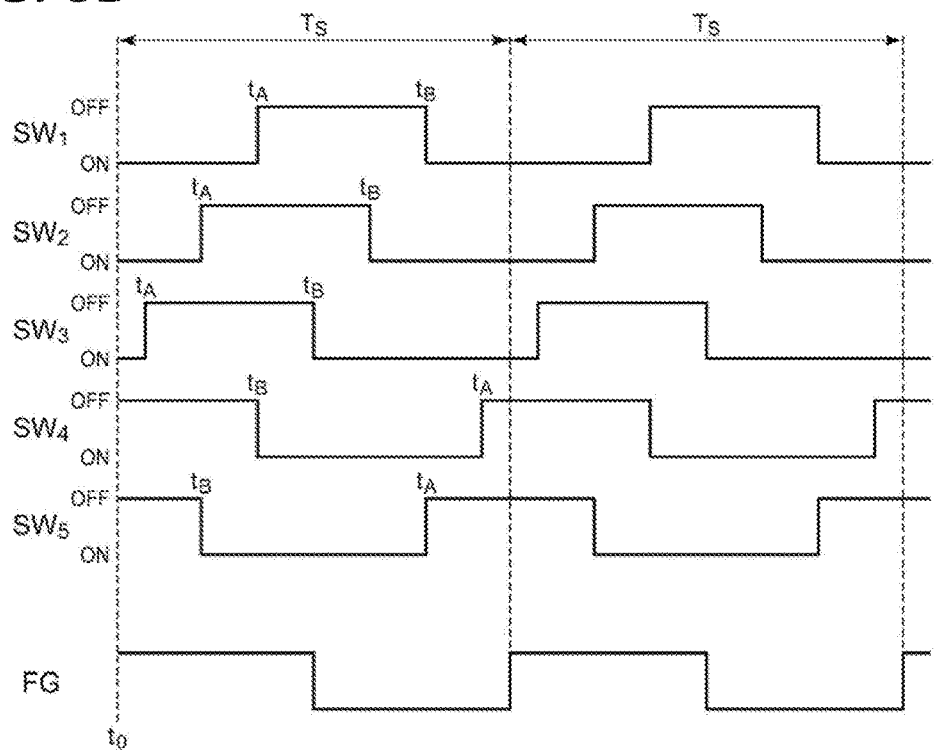

FIGS. 6A and 6B are views for explaining a process of forming a light distribution pattern in the motorway mode. FIG. 6A is a view illustrating a state in which the plurality of scanning regions $SR_1$ to $SR_5$ are displaced and arranged side by side in an easy to see manner. In the scanning region SR, a hatched area indicates an illumination region B which is actually illuminated with light, and an alternate long and short dashes line indicates non-illumination regions A and C which are not illuminated with light. $Sc_1$ to $Sc_5$ indicate positions of light condensing spots at the same time. It is assumed that the light condensing spot Sc moves from the left to the right in the drawing, and a right end of the light condensing spot Sc is referred to as a leading edge LE, and a left end of the light condensing spot Sc is referred to as a trailing edge TE. It is assumed that at a certain time $t_0$, the trailing edge TE of the light condensing spot $Sc_i$ is positioned at a left end of the illumination region $SR_i$.

FIG. 6B is a time chart illustrating states of the plurality of bypass switches $SW_1$ to $SW_6$. Because the bypass switches (a set of $SW_1$, $SW_6$, and $SW_3$ or a set of $SW_5$, $SW_7$, and $SW_9$) at the same position in the horizontal direction may be controlled at the same timing, only the operation of controlling the bypass switches $SW_1$ to $SW_5$ will be described herein. An $i^{th}$ bypass switch SWi is turned OFF during a period for which the corresponding light condensing spot $Sc_i$ passes through the illumination region B, and the $i^{th}$ bypass switch SWi is turned ON during a period for which the corresponding light condensing spot $Sc_i$ passes through the non-illumination regions A and C. Ts indicates a scanning cycle.

A timing $t_A$ of turning OFF the bypass switch SW (turning ON the light emitting unit 112) may be a timing at which the trailing edge (left end) TE of the light condensing spot Sc has passed through the left end of the illumination region. Meanwhile, a timing $t_B$ of turning ON the bypass switch SW (turning OFF the light emitting unit 112) may be a timing at which the leading edge (right end) LE of the light condensing spot Sc has reached a right end of the illumination region. In this control, illuminance of the non-illumination region may be zero.

The transition timings $t_A$ and $t_B$ of the bypass switch SW may be set in advance to a value made by normalizing elapsed time from a certain reference time $t_0$ at the scanning cycle $T_s$. Therefore, it is possible to control the bypass switch SW at an appropriate timing even though the rotational speed of the motor is changed and the scanning cycle Ts is changed. Here, the reference time $t_0$ may be coincident with a point of variation of the FG signal.

Figure 7A:
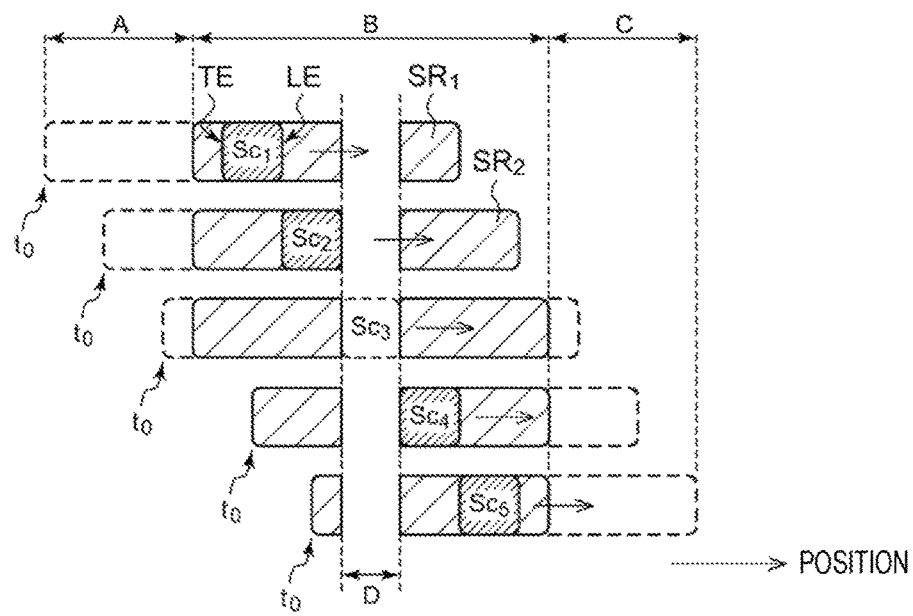
FIGS. 7A and 7B are views for explaining the formation of a light shielding region.
Figure 7B:
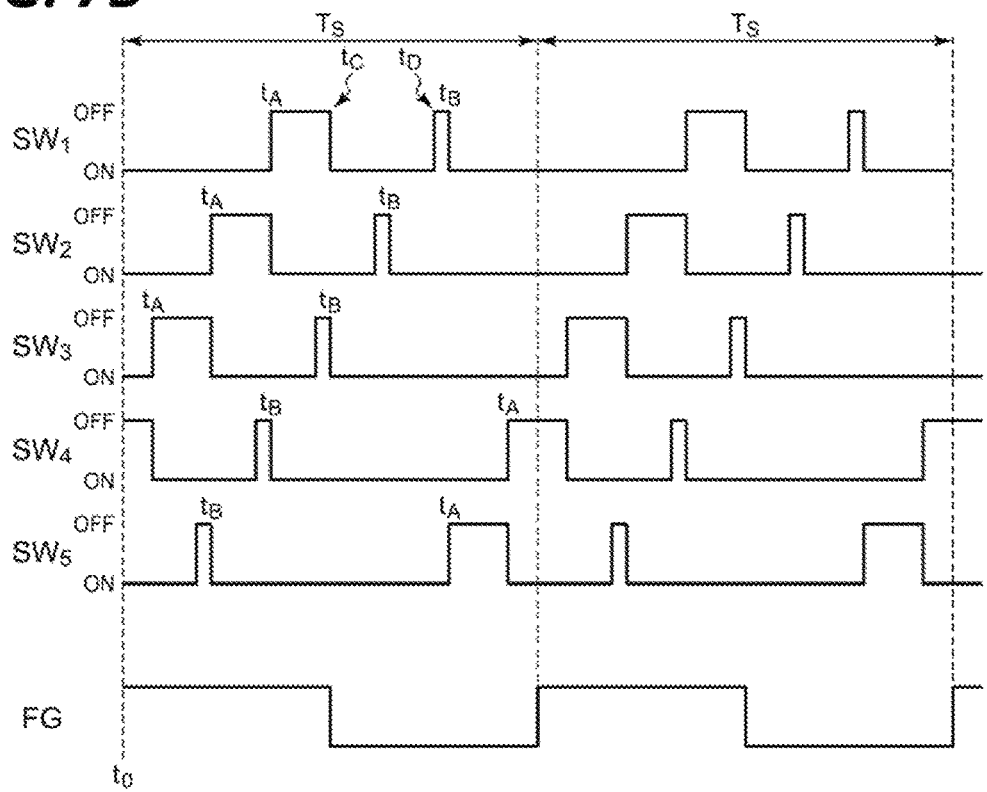

Next, a process of forming the light shielding region will be described. FIGS. 7A and 7B are views for explaining a process of forming the light shielding region. FIG. 7A is a view illustrating a state in which the plurality of scanning regions $SR_1$ to $SR_5$ are displaced and arranged side by side in an easy to see manner. FIG. 7B is a time chart illustrating states of the plurality of bypass switches $SW_1$ to $SW_6$. The motorway mode will also be described as an example. The light shielding region is indicated by D. The $i^{th}$ bypass switch $SW_i$ is controlled to be turned ON during a period for which the corresponding light condensing spot $Sc_i$ passes through the light shielding region D.

A timing $t_C$ of turning ON the bypass switch SW (turning OFF the light emitting unit 112) corresponding to the light shielding region D may be a timing at which the leading edge (right end) LE of the light condensing spot Sc reaches the left end of the light shielding region D. Meanwhile, a timing $t_D$ of turning OFF the bypass switch SW (turning ON the light emitting unit 112) may be a timing at which the trailing edge (left end) TE of the light condensing spot Sc reaches the right end of the light shielding region D.

Figure 8A:
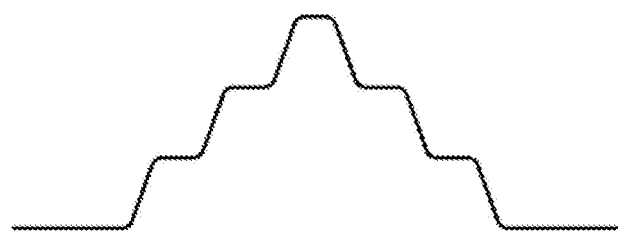
FIGS. 8A to 8C are views for explaining electronic swiveling.
Figure 8B:
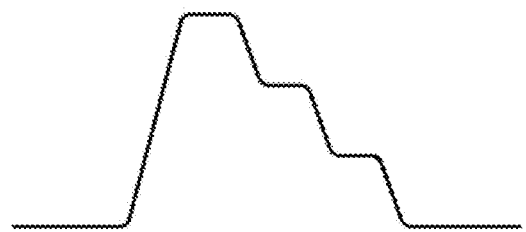
Figure 8C:
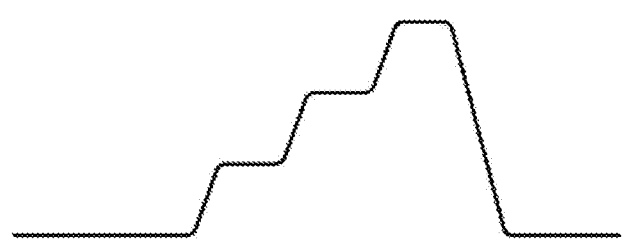

As illustrated in FIG. 2C, the five light emitting units 112_1 to 112_5 in the lowermost stage are classified into the three channels $CH_1$ to $CH_3$. Therefore, as described below, electronic swiveling is enabled. FIGS. 8A to 8C are views for explaining the electronic swiveling. FIGS. 8A to 8C illustrate a light distribution pattern (illuminance distribution) in the vicinity of the H line on the virtual screen which is formed by the light emitting units 112 in the lowermost stage. FIGS. 8A to 8C correspond to when the vehicle travels straight, when the vehicle turns left, and when the vehicle turns right, respectively.

The present disclosure has been described above based on the exemplary embodiment. It will be appreciated by those skilled in the art that the exemplary embodiment is an example, and various modifications may be made by a combination of the respective constituent elements or the respective treatment processes and the modifications are also be included in the scope of the present disclosure. Hereinafter, the modifications will be described.

(Modification 1)

When the light is permitted to reach the non-illumination region in respect to the operation of controlling the bypass switch SW, the timing $t_A$ of turning OFF the bypass switch SW (turning ON the light emitting unit 112) may be the timing at which the leading edge (right end) LE of the light condensing spot Sc has passed through the left end of the illumination region.

On the contrary, the timing $t_B$ of turning ON the bypass switch SW (turning OFF the light emitting unit 112) may be the timing at which the trailing edge (left end) TE of the light condensing spot Sc has reached the right end of the illumination region.

(Modification 2)

Figure 9C:
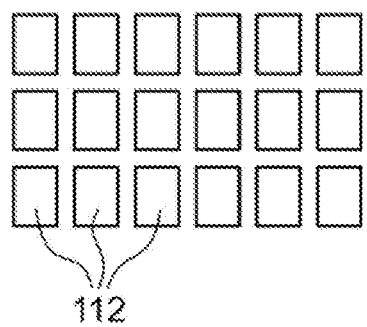

In the exemplary embodiment, the plurality of light emitting units 112 are disposed in a U shape as illustrated in FIG. 2A, but the shape is not limited thereto. FIGS. 9A to 9C are views illustrating modifications of layouts of the light emitting units 112. In FIG. 9A, the light emitting units 112 are disposed in an inverted T shape. In FIG. 9B, the light emitting units 112 are disposed in a rotated E shape. In FIG. 9C, the light emitting units 112 are disposed in a rotated L shape. The disposition to be selected may be determined in accordance with a diffusion angle of the emitted light from the projection optical system 130.

In the exemplary embodiment, the light condensing regions 5, which are formed by the right and left lamps, respectively, overlap each other in substantially the same range, but the present disclosure is not limited thereto, and the light condensing regions 5 may partially overlap each other at a center.

(Modification 3)

In the light distribution mode in FIGS. 3A to 3C, the drive currents applied to the three channels $CH_1$ to $CH_3$ which illuminate the same height are equal to one another, but the present disclosure is not limited thereto. For example, in the motorway mode, the drive currents applied to the three channels $CH_1$ to $CH_3$ may be different from one another.

(Modification 4)

In the exemplary embodiment, the number of light emitting units 112 per one channel is one or two, but the present disclosure is not limited thereto, and three or more light emitting units 112 may be allocated to one channel and may be operated by one constant current driver.

(Modification 5)

The configuration of the scanning optical system 120 is not limited to the configuration illustrated in FIG. 1. For example, a configuration in which an illumination spot is formed by a polygon mirror or a galvano mirror may be made. Otherwise, a structure in which emission angles of the plurality of light emitting units 112 are controlled by an actuator may be made.

(Modification 6)

In the exemplary embodiment, the plurality of light emitting units 112 are disposed such that the plurality of light condensing spots Sc formed by the plurality of light emitting units 112 do not overlap one another on the virtual screen 1 as illustrated in FIG. 2B, but the present disclosure is not limited thereto. Light condensing spots, which correspond to two or more light emitting units 112, may overlap one another on the virtual screen 1.

(Modification 7)

In the exemplary embodiment, the light distribution is formed by the overlap between the diffusion region by non-scanning and the light condensing region by scanning, but the present disclosure is not limited thereto, and the light distribution pattern may be formed only by the scanning optical system.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicular lamp comprising:
a light source unit including a plurality of light emitting units that are classified into a plurality of channels so that a plurality of light emitting units included in the same channel are connected in series;
a scanning optical system configured to receive emitted light of the light source unit and scan the emitted light in front of the vehicle by repeating a predetermined periodic motion; and
a lighting circuit configured to operate the plurality of light emitting units,
wherein the lighting circuit includes:
a plurality of lighting units corresponding to the plurality of channels; and
a controller configured to control the plurality of lighting units,
each of the lighting units includes:
a constant current driver configured to supply a drive current to the plurality of light emitting units included in a corresponding channel; and
a plurality of bypass switches each configured to form a bypass path that is in parallel with a corresponding light emitting unit of the plurality of light emitting units included in the corresponding channel,
the controller is configured to switch a plurality of light distribution modes, and (i) a drive current to be created by each of the constant current drivers and (ii) a period for which each of the plurality of bypass switches is to be turned ON during one scanning period are specified for each light distribution mode in respect to each of the plurality of lighting units.

2. The vehicular lamp of claim 1, wherein the plurality of light emitting units included in the same channel are disposed to illuminate the same height on a virtual screen.

3. The vehicular lamp of claim 2, wherein the plurality of light emitting units are disposed in two or more stages in a height direction and a greatest number of light emitting units are disposed in a lowermost stage.

4. The vehicular lamp of claim 3, wherein the plurality of light emitting units in the lowermost stage are classified into three or more channels.

5. The vehicular lamp of claim 1, wherein the plurality of light emitting units are disposed such that emitted lights thereof illuminate different points on a virtual screen at a same time.

6. The vehicular lamp of claim 1, wherein the plurality of light emitting units are disposed in N stages (N≥3), and when a current amount to be supplied to an $i^{th}$ ($1 \leq i \leq N$) light emitting unit from a lower side is $I_i$, a relationship of $I_1 \geq \ldots \geq I_N$ is satisfied in each of the plurality of light distribution modes.

7. The vehicular lamp of claim 1, wherein the plurality of light emitting units are disposed in N stages (N≥3), and when a maximum current to be supplied to an $i^{th}$ ($1 \leq i \leq N$) light emitting unit from a lower side is $I_{i(MAX)}$, a relationship of $I_{1(MAX)} > \ldots > I_{N(MAX)}$ is satisfied.

8. The vehicular lamp of claim 1, wherein the plurality of light emitting units are disposed in a U shape, an inverted T shape, a rotated E shape, or a rotated L shape.

9. The vehicular lamp of claim 1, wherein the controller also forms a bypass path by the corresponding bypass switch while the emitted lights of the light emitting units pass through a light shielding region.

10. The vehicular lamp of claim 1, wherein the vehicular lamp is configured such that a light condensing region formed by emitted light of the scanning optical system and a diffusion region formed by emitted light of a non-scanning optical system overlap each other.

11. A scanning-type vehicular lamp comprising:
a plurality of light emitting units ON/OFF of which is switched independently,
wherein the plurality of light emitting units are disposed so that a desired light distribution is formed by overlapping scanning of illumination spots formed on a virtual screen by emitted lights thereof,
the plurality of light emitting units are classified into a plurality of channels, the same direct drive current is supplied to at least one light emitting unit of all of the plurality of light emitting units included in the same channel, the drive current is constantly maintained during a scanning period, a current amount of drive current for each channel is set in accordance with a light distribution mode, and ON/OFF of each of the light emitting units is switched at a predetermined timing determined in accordance with the light distribution mode during the scanning period.

* * * * *